(12) United States Patent
Nishiyama

(10) Patent No.: US 8,558,681 B2
(45) Date of Patent: Oct. 15, 2013

(54) GRAPHIC METER DISPLAY DEVICE AND METHOD

(75) Inventor: Hiroshi Nishiyama, Susono (JP)

(73) Assignee: Yazaki Corporation, Tokyo (JP)

( * ) Notice: Subject to any disclaimer, the term of this patent is extended or adjusted under 35 U.S.C. 154(b) by 265 days.

(21) Appl. No.: 13/186,808

(22) Filed: Jul. 20, 2011

(65) Prior Publication Data
US 2012/0019374 A1 Jan. 26, 2012

(30) Foreign Application Priority Data

Jul. 23, 2010 (JP) ................................ 2010-166402

(51) Int. Cl.
*B60Q 1/00* (2006.01)
*G08B 5/24* (2006.01)

(52) U.S. Cl.
USPC ...... 340/438; 340/525; 340/815.78; 340/461; 362/23.21; 116/288; 345/440; 345/440.2

(58) Field of Classification Search
USPC ............ 340/438, 815.78; 362/23.21; 116/288
See application file for complete search history.

(56) References Cited

U.S. PATENT DOCUMENTS

| | | | | |
|---|---|---|---|---|
| 6,064,401 A | * | 5/2000 | Holzman et al. ............... | 345/440 |
| 2007/0285388 A1 | | 12/2007 | Ogasawara | |
| 2007/0296724 A1 | | 12/2007 | Katoh et al. | |
| 2008/0018597 A1 | | 1/2008 | Shirakura et al. | |

FOREIGN PATENT DOCUMENTS

| | | |
|---|---|---|
| JP | 2007-303894 A | 11/2007 |
| JP | 2007-309719 A | 11/2007 |
| JP | 2008-008637 A | 1/2008 |

* cited by examiner

*Primary Examiner* — Donnie Crosland
(74) *Attorney, Agent, or Firm* — Sughrue Mion, PLLC

(57) ABSTRACT

A graphic meter display device includes a tick mark information retaining section that retains information about display coordinates of respective positions of three or more typical tick marks among tick marks, in correspondence with typical numeric values assigned to the respective positions; an indicator needle coordinate calculation section that extracts two typical numeric values adjacent, above and below, to a magnitude of the input measured value according to the input measured value as a first typical numeric value and a second typical numeric value from the positions of three or more typical tick marks and that calculates, as coordinates of an indicator needle point, an intermediate position, which lies on a line segment connecting coordinates corresponding to the first typical numeric value to coordinates corresponding to the second typical numeric value and which is determined by means of the first typical numeric value, the second typical numeric value, and the measured value; and a graphic display section that renders a display pattern of the indicator needle in a vicinity of the coordinates of the indicator needle point and with reference to the coordinates of the indicator needle point.

8 Claims, 10 Drawing Sheets

INDICATOR NEEDLE LENGTH CHANGE RATIO "t"=L/K

WHEN 2000 rpm IS POINTED

GRAPHIC METER DISPLAY DEVICE AND METHOD

BACKGROUND OF THE INVENTION

1. Field of the Invention

The present invention relates to a graphic meter display device and method that can be utilized for a display on; for instance, a vehicle gauge board, and the like.

2. Description of the Related Art

A vehicle, like an automobile, is equipped with various meters; for instance, a speed meter, a tachometer, and others. In each of such meters mentioned above, an indicator needle put on a predetermined number plate is generally actuated by an electric motor, and the like, in accordance with a measured value, whereby the indicator needle that performs a physical turn is controlled so as to point a position of a tick mark corresponding to a measured value.

In the meantime, as described in connection with; for instance, Patent Document 1 to Patent Document 3, techniques for displaying a meter through use of a graphic display, have already been developed. Specifically, when there is used a display device, like a liquid-crystal display panel in which a plurality of pixels capable of individually controlling a display are two-dimensionally arranged, respective display elements making up a meter, such as an indicator needle and tick marks, can be displayed as a graphic display pattern that is a combination of a plurality of pixel displays. Accordingly, a physical indicator needle becomes unnecessary, and a drive unit for actuating an indicator needle also becomes unnecessary.

Patent Documents 1 through 3 disclose proposed techniques for switching between a normal indicator needle pattern and a special display pattern (motion blur) in response to a change in turning speed of the indicator needle to be displayed.

Patent Document 1: JP-A-2007-303894
Patent Document 2: JP-A-2007-309719
Patent Document 3: JP-A-2008-8637

Incidentally, when a meter is displayed by means of a graphic display, such as that mentioned above, the following processing is performed in reality. Since a number plate and tick marks of a meter usually assume shapes close to a circular geometry, a direction to be pointed by the indicator needle must be calculated in accordance with a measured value to be pointed. For instance, in the case of a tachometer that displays the number of revolutions (rpm) of the engine, a pitch of tick marks showing an angle variation on a display unit basis is set to; for instance, 0.0225 degrees/rpm, on premise that the tick marks are equidistantly spaced. In this case, when a measured value represents 2000 rpm, a direction of the indicator needle to be displayed is determined to be (0.0225 degrees×2,000 rpm)), so that a direction of 45 degrees is selected. A pattern of the indicator needle is rendered by use of a graphic display so as to point at a direction of 45 degrees from the predetermined position of the center axis of the indicator needle. However, when the graphic display, such as that mentioned above, is provided, the following problems are encountered.

1. An error sometimes occurs during calculation of a direction of the indicator needle to be displayed.

2. When a pattern of the indicator needle is graphically displayed along the thus-determined direction, the orientation of the pattern must be changed by calculation of a previously determined pattern. There may be a case where the pattern will be deformed during calculation.

3. When tick marks of the number plate are rendered in conformity with an angle, there may be a case where the tick marks will be rendered in a misaligned manner.

When the calculation error and the pattern deformation, such as those mentioned above, occur, a position pointed by an indicator needle to be displayed may go out of alignment with a position of a tick mark corresponding to an originally measured value, which in turn causes a display error. In order to diminish the possibility of occurrence of such a display error, it is necessary to adopt a high resolution display panel, to prepare a precise display pattern, and to enhance a degree of accuracy of calculation. This results in an increase in cost of the display device, which inevitably leads to an increase in burden of display processing.

Moreover, in the case of; for instance, a speed meter of an automobile, there are cases where tick marks are not spaced equidistantly in a low speed zone, or the like. In this case, it is necessary to calculate a direction of the indicator needle by application of a pitch value differing from a normal pitch value to the zone where the tick marks are not spaced equidistantly, which makes display processing complicate.

Further, when a meter is graphically displayed through use of a liquid-crystal display panel, or the like, a high degree of freedom is considered to be available in connection with a design to be displayed as a meter. In order to enhance a commodity value or visibility of the meter, a meter having a unique geometry is sometimes required to be designed. For instance, there is a conceivable chance of appearance of gauge boards assuming an oval shape and a polygonal shape.

However, even when a related art meter is graphically displayed, the display is based on the presumption that tick marks are spaced equidistantly as mentioned above. In addition, the indicator needle also has a constant length; hence, a specially designed meter, like an oval meter and a polygonal meter, cannot have been adopted. If such a design is adopted, there is a high likelihood of occurrence of a greater display error or deterioration of visibility.

SUMMARY OF THE INVENTION

The present invention has been conceived in light of the circumstance and aims at providing a graphic meter display device and method that prevents a position pointed by an indicator needle to be displayed from going out of alignment with a correct position of a tick mark corresponding to a measured value and also that can enhance a degree of design freedom of the meter.

In order to accomplish the objective, a graphic meter display device of the present invention has the following characteristics (1) to (7).

(1) A graphic meter display device that has an indicator needle for pointing out an input measured value and tick marks for enabling reading of a value pointed by the indicator needle and that visibly displays at least the indicator needle at a position corresponding to the measured value by means of a graphic display, the display device comprising:

a tick mark information retaining section that, in relation to respective positions of three or more typical readable tick marks among tick marks, retains information representing display coordinates in correspondence with typical numeric values assigned to the typical tick mark positions;

an indicator needle point coordinate calculation section that extracts, as a first typical numeric value and a second typical numeric value, two typical numeric values adjacent, above and below, to a magnitude of the input measured value from the positions of the three or more typical numeric values according to the input measured value and that calculates an intermediate position which lies on a line segment connecting first display coordinates corresponding to the first typical numeric value with second display coordinates corresponding to the second typical numeric value and which is determined by the first typical numeric value, the second typical numeric value, and the measured value as coordinates of an indicator needle point; and a graphic display section that renders a display pattern of the indicator needle in such a way that an extremity of the indicator needle or a portion thereof is situated in a vicinity of the coordinates of the indicator needle point and with reference to the coordinates of the indicator needle point.

(2) The graphic meter display device mentioned in connection with (1), wherein the indicator needle point coordinate calculation section calculates an intermediate position, where the line segment is to be split, as coordinates of an indicator needle point according to a ratio of a spacing value that is a difference between the first typical numeric value and the second typical numeric value to a fractional value that is a difference between the measured value and the first typical numeric value or the second typical numeric value.

(3) The graphic meter display device mentioned in connection with (2), wherein the graphic display section calculates a pointing direction of the indicator needle from coordinates of a predetermined indicator needle axis and the coordinates of the indicator needle point, rotates a previously prepared indicator needle image pattern according to the pointing direction through calculation processing, and pastes the rotated indicator needle image pattern to a display position determined from the coordinates of the indicator needle axis and the coordinates of the indicator needle point, thereby displaying the indicator needle.

(4) The graphic meter display device mentioned in connection with (2), wherein the graphic display section renders, on the basis of coordinates of previously determined indicator needle axis and the coordinates of the indicator needle point, a linear pattern connecting the coordinates of the indicator needle point to the coordinates of the indicator needle axis in previously designated color and thickness and displays the thus-rendered indicator needle.

(5) The graphic meter display device mentioned in connection with (2), wherein, the graphic display section renders, on the basis of coordinates of previously determined indicator needle axis and the coordinates of the indicator needle point, line segments in number equal to a previously designated thickness, around a line connecting the coordinates of the indicator needle point to the coordinates of the indicator needle axis, and displays the indicator needle.

(6) The graphic meter display device mentioned in connection with (1), wherein the indicator needle point coordinate calculation section determines whether or not a numeric value matching the input measured value is included in the typical numeric values assigned respectively to the three or more typical tick mark positions and outputs a corresponding typical numeric value as coordinates of the indicator needle point when a match exists.

(7) The graphic meter display device mentioned in connection with any one of (1) to (6), wherein the tick mark information retaining section retains information for rendering the tick marks in correspondence with image data for rendering a number plate.

In the graphic meter display device having the configuration mentioned in connection with (1), the coordinates of the indicator needle point serving as a reference for a position pointed by the indicator needle are determined from the first typical value, the second typical value, and coordinates thereof. Therefore, it is not necessary to calculate a direction by use of a pitch among the tick marks, and occurrence of an error, which would otherwise be caused by calculation, can be prevented. In addition, even when the tick marks are not equidistantly spaced, the coordinates of the indicator needle point can be matched to a correct position to be pointed according to the coordinates of the first typical numeric value and the coordinates of the second typical numeric value. Therefore, a degree of design freedom of the meter can be enhanced.

The graphic meter display device mentioned in connection with (2) can match to a correct position the coordinates of the indicator needle point serving as a reference for a position pointed by the indicator needle.

The graphic meter display device mentioned in connection with (3) can display an indicator needle of an image pattern that points out a direction of the coordinates of the indicator needle point while taking the coordinates of the indicator needle point as a center of rotation. Since a previously prepared indicator needle image pattern is utilized, indicator needles of various designs can be displayed.

The graphic meter display device mentioned in connection with (4) renders the indicator needle by use of a linear pattern, and hence processing becomes simple. A previously prepared two-dimensional pattern does not need to be rotated, and deformation does not arise in the shape of the display pattern. Hence, a position pointed by the indicator needle is less likely to cause displacement.

The graphic meter display device mentioned in connection with (5) renders a plurality of line segments, thereby displaying an indicator needle. Hence, processing becomes simple. A previously prepared two-dimensional pattern does not need to be rotated, and deformation does not arise in the shape of the display pattern. Hence, a position pointed by the indicator needle is less likely to cause displacement.

The graphic meter display device mentioned in connection with (6) makes it possible to accurately align the position of the indicator needle to coordinates of a specific typical numeric value matching an input measured value. Processing is speeded up when compared with processing performed when a match does not exist.

The graphic meter display device mentioned in connection with (7) makes it possible to change the graphic display of the meter without involvement of a necessity for changing a program by means of replacing only bitmap image data for displaying a number plate.

In order to accomplish the objective, the graphic meter display method of the present invention is characterized by (8) to be described below.

(8) A graphic meter display method for visibly displaying at least an indicator needle of a meter, which has the indicator needle for pointing out an input measured value and tick marks for enabling reading of a value pointed by the indicator needle, at a position corresponding to the measured value by means of a graphic display, the method comprising:

retaining, in relation to respective positions of three or more typical readable tick marks among tick marks, information representing display coordinates in correspondence with typical numeric values assigned to the typical tick mark positions;

extracting, as a first typical numeric value and a second typical numeric value, two typical numeric values adjacent, above and below, to a magnitude of the input measured value from the positions of the three or more typical tick marks according to the input measured value;

calculating an intermediate position which lies on a line segment connecting first display coordinates corresponding to the first typical numeric value with second display coordinates corresponding to the second typical numeric value and which is determined by the first typical numeric value, the second typical numeric value, and the measured value as coordinates of an indicator needle point; and rendering a display pattern of the indicator needle in such a way that an extremity of the indicator needle or a portion thereof is situated in the vicinity of the coordinates of the indicator needle point and with reference to the coordinates of the indicator needle point.

According to the graphic meter display method having the foregoing configuration mentioned in connection with (8), the coordinates of the indicator needle point serving as a reference for a position to be indicated by the indicator needle are determined from the first typical numeric value, the second typical numeric value, and coordinates thereof. Accordingly, it does not need to calculate a direction by use of a pitch of the tick marks, and hence occurrence of an error, which would otherwise be caused by the calculation, can be prevented. Further, even when the tick marks are not equidistantly spaced, the coordinates of the indicator needle point can be matched to a correct position to be pointed according to coordinates of the first typical numeric value and coordinates of the second typical numeric value. Hence, the degree of design freedom of the meter can be enhanced.

As above, the graphic meter display device and method of the present invention makes it possible to prevent a position pointed by an indicator needle to be displayed from going out of alignment with a correct position of a tick mark corresponding to a measured value. Moreover, a degree of design freedom of a meter can also be enhanced.

The present invention has been briefly described thus far. An embodiment for implementing the present invention to be described below is read through by reference to the accompanying drawings, whereby details on the present invention will be further clarified.

DESCRIPTION OF THE PREFERRED EMBODIMENTS

A specific example of a graphic meter display device and method of the present invention is hereunder described by reference to the drawings.

Figure 1:
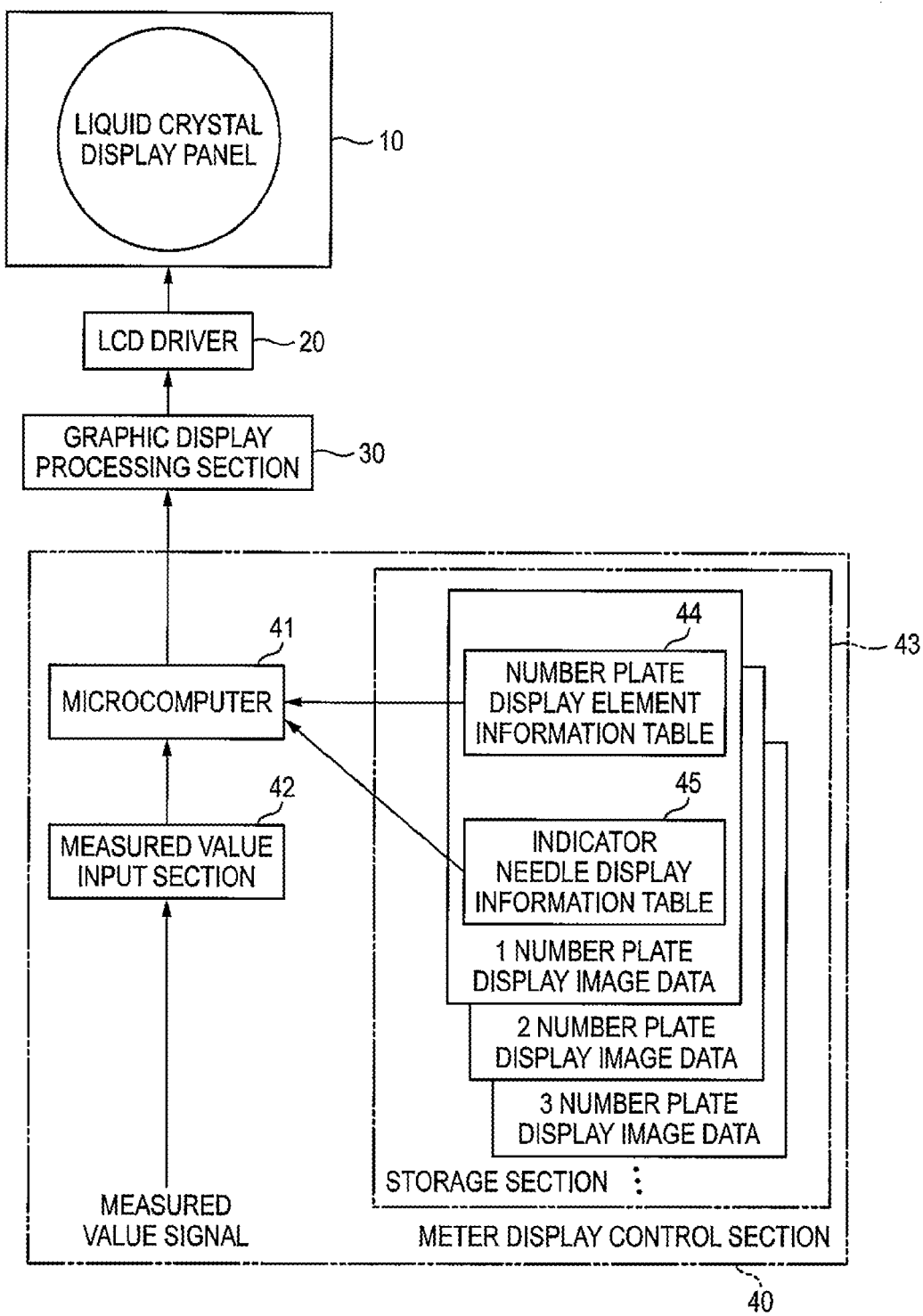
FIG. 1 is a section diagram showing a principal configuration of a graphic meter display device of an embodiment.

FIG. 1 shows a principal configuration of the graphic meter display device of the present embodiment. Conceivable specific meters displayed by the graphic display device include various meters mounted in a gauge board of an automobile; for instance, a tachometer, a speed meter, a fuel gauge, a water temperature gauge, a clock, and the like. As a matter of course, the present invention can also be utilized for meters employed in applications other than the automobile.

As shown in FIG. 1, the graphic meter display device includes a liquid crystal display panel 10, an LCD (liquid crystal display) driver 20, a graphic display processing section 30, and a meter display control section 40.

The liquid crystal display panel 10 includes minute liquid crystal display cells whose display statuses are individually controllable are arranged in numbers side by side and in both horizontal and vertical directions, thereby forming a two-dimensional array. The liquid crystal display panel can also provide a color display. Pixels to be displayed by means of the liquid crystal display cells are arranged in numbers side by side, to thus provide a display. As a result, an arbitrary two-dimensional geometrical pattern can be graphically displayed.

According to a signal output from the graphic display processing section 30, the LCD driver 20 switches a voltage to be applied to electrodes of the respective liquid-crystal display cells of the liquid crystal display panel 10.

The graphic display processing section 30 is an electric circuit that performs processing required for the liquid crystal display panel 10 to produce a graphic display. Image memory for retaining data pertaining to pixels to be displayed at positions of the respective liquid crystal display cells of the liquid crystal display panel 10 and a rendering processor are provided in the graphic display processing section 30. In accordance with a command input by the meter display control section 40, the rendering processor can render an image of a two-dimensional pattern having a specified shape or data pertaining to a one-dimensional line pattern and write the thus-rendered data on to the image memory.

The meter display control section 40 has a microcomputer 41, a measured value input section 42, and a storage section 43. The storage section 43 is built from read-only memory (ROM) and retains data pertaining to a previously-prepared number plate display element information table 44 and a previously-prepared indicator needle display information table 45.

The microcomputer 41 includes built-in constituent elements like a microprocessor, ROM, RAM, and others. The microprocessor executes a prepared program in the ROM, whereby control operation to be described later can be implemented.

The measured value input section 42 performs input processing for converting a signal of a measured value input from the outside into a signal that the microcomputer 41 can process. For instance, when the graphic display device is used as a tachometer of an automobile, a pulse signal output from a rotation sensor that detects rotation of an output shaft of the engine is input.

Figure 2:
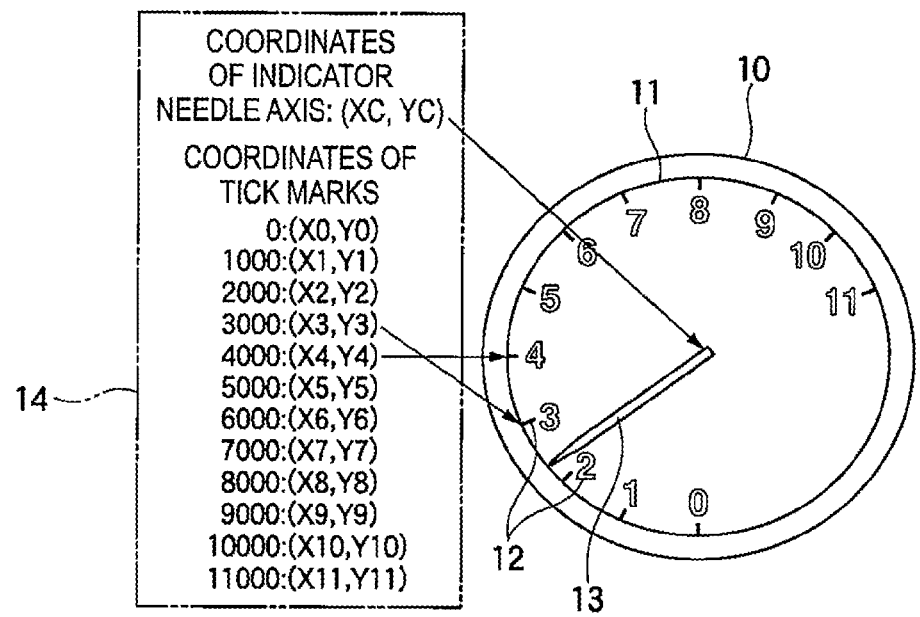
FIG. 2 is diagrammatic illustration showing a specific example relationship between details of a display of a meter and coordinate data pertaining to tick marks.

FIG. 2 shows a specific example meter displayed on the liquid crystal display panel 10 when the graphic meter display device is used as a tachometer. In the example shown in FIG. 2, a number plate 11 displayed on the liquid crystal display panel 10 is circular, and tick marks 12 and an indicator needle 13 arranged in a circular arc layout are displayed on the number plate 11. The tick marks 12 are displayed in the form of a static image, and the indicator needle 13 is displayed at a position corresponding to the latest measured value.

Narrow line-shaped tick mark patterns showing positions of tick marks are spaced and displayed at substantially equidistantly in the tick marks 12 shown in FIG. 2 along with letters "0," "1," "2," "3," "4," "5," "6," "7," "8," "9," "10," and "11" representing typical numeric values 0, 1000, 2000, 3000, 4000, 5000, 6000, 7000, 8000, 9000, 10000, and 11000 (in rpm). The tick mark patterns are sometimes spaced not equidistantly.

In order to utilize a group of sets of coordinate data 14 at the time of determination of a position on the number plate 11 where the indicator needle 13 is to be displayed, the group of sets of coordinate data 14, such as that shown in FIG. 2, is retained in the number plate display element information table 44 or the indicator needle display information table 45 shown in FIG. 1. The number plate display element information table 44 or the indicator needle display information table 45 is recorded in the storage section 43 while being packaged for each bitmap (BMP) image data for displaying a number plate. By adoption of such a data format, the graphic display of the meter can be changed without involvement of a necessity to change a program by means of only changing the bitmap image data for graphically displaying a number plate.

The group of sets of coordinate data 14 shown in FIG. 2 includes information about coordinates (XC, YC) of the indicator needle axis and respective typical numeric values of the tick marks. Information about coordinates of tick marks on the number plate 11 is brought into correspondence with the respective typical numeric values. For instance, coordinate values of the X and Y coordinates represented by (X2, Y2) are stored in correspondence with a typical numeric value of 2000 rpm, and coordinate values of the X and Y coordinates represented by (X3, Y3) are stored in correspondence with a typical numeric value of 3000 rpm.

Figure 3:
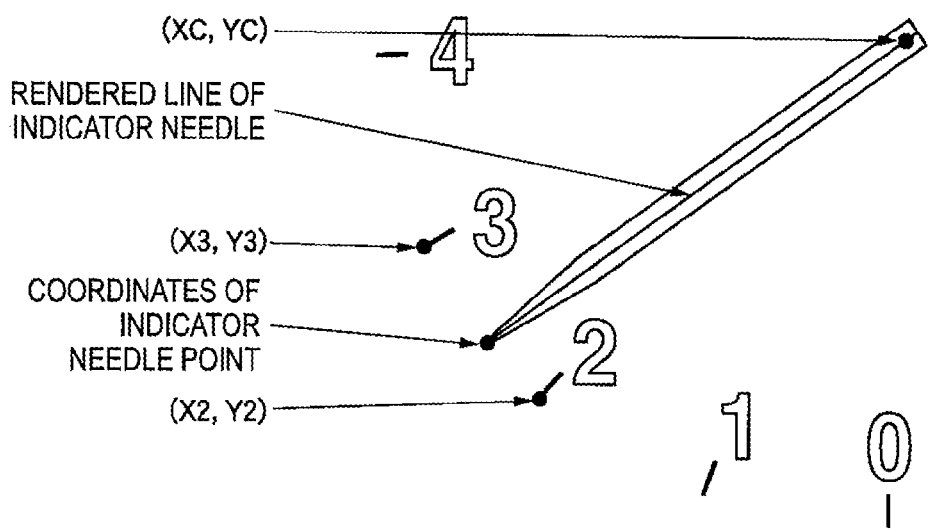
FIG. 3 is a front view showing a specific example of coordinates of an indicator needle on a number plate of the meter.

Specifically, as shown in FIG. 3, a position of the typical numeric value of 2000 rpm on the number plate around which letter "2" is displayed corresponds to coordinates (X2, Y2). A position of the typical numeric value of 3000 rpm on the number plate around which letter "3" is displayed corresponds to coordinates (X3, Y3).

When a meter is displayed in a form, such as that shown in FIGS. 2 and 3, a position of turning center of the indicator needle 13 is fixed to a position determined by the coordinates (XC, YC) of the indicator needle axis. According to an input measured value, coordinates of an indicator needle point that determine a position of an extremity of the indicator needle 13 move to a position close to a tick mark. The coordinates of the indicator needle point are determined by use of a method, such as that will be described below.

First, two typical numeric values that are vertically adjacent, above and below, to an input measured value are extracted from the plurality of typical numeric values as a first typical numeric value and a second typical numeric value. For instance, when a value of 2400 rpm is input as a measured value, a number of 3000 and a number of 2000 are selected as the first typical numeric value and the second typical numeric value.

Next, by means of the first typical numeric value, the second typical numeric value, and the measured value, there is determined an intermediate position on a line segment that connects first display coordinates [the position of (X3, Y3) in FIG. 3] representing the position of the first typical numeric value to second display coordinates [the position of (X2, Y2) in FIG. 3] representing the position of the second typical numeric value. The intermediate position is calculated as coordinates of an indicator needle point.

For instance, when a measured value is 2400 rpm, a length is determined by multiplexing by a ratio A1 provided below a length L0 of the line segment that connects the first display coordinates (X3, Y3) to the second display coordinates (X2, Y2). The line segment is divided by use of the thus-determined length, thereby determining the intermediate position as coordinates of the indicator needle point.

$$A1=(2400-2000)/(3000-2000)=4/10$$

The coordinates of the indicator needle point determined this time lie on the line segment, and a distance from the second display coordinates (X2, Y2) to the coordinates of the first display coordinates corresponds to a position of (L0× A1).

Alternatively, a length is determined by multiplexing by a ratio A2 provided below a length L0 of the line segment that connects the first display coordinates (X3, Y3) to the second display coordinates (X2, Y2).

$$A2=(3000-2400)/(3000-2000)=6/10$$

The coordinates of the indicator needle point determined this time lie on the line segment, and a distance from the first display coordinates (X3, Y3) to the coordinates of the indicator needle point corresponds to a position of (L0×A2).

If the indicator needle 13 is displayed in such a way that the extremity of the indicator needle 13 comes to the position thus determined by the coordinates of the indicator needle point as shown in FIG. 3, the indicator needle 13 can point out a correct position corresponding to the measured value by means of the tick marks even when the tick marks 12 are not equidistantly spaced.

In the case of a meter for an automobile, a driver who is in the course of driving must read a display on the meter by means of instantaneous visual recognition and encounters difficulty in reading narrow small tick marks. Accordingly, the driver often ascertains an approximate measured value from a relative positional relationship between positions of a plurality of typical numeric values put on the tick marks and a position of the extremity of the indicator needle. Therefore, eliminating a difference between the position of the typical numeric value and the position pointed by the indicator needle is very important.

When the display position of the indicator needle 13 is determined by use of the coordinates of the indicator needle point calculated by the foregoing method, a locus of movement of the position pointed by the indicator needle 13 changes so as to trace a polygonal geometry having a plurality of typical numeric values as vertices. However, so long as the number of typical numeric values is increased to thereby reduce spacing between tick marks, the locus of movement of the indicator needle can be approximated to a circular-arc shape. As mentioned above, tick marks are arranged at narrow pitches, and a trace of movement of the position pointed by the indicator needle is plotted on the tick marks, whereby the indicator needle points out the numeric values in a more detailed manner, so that the accuracy of the meter is enhanced.

Figure 4:
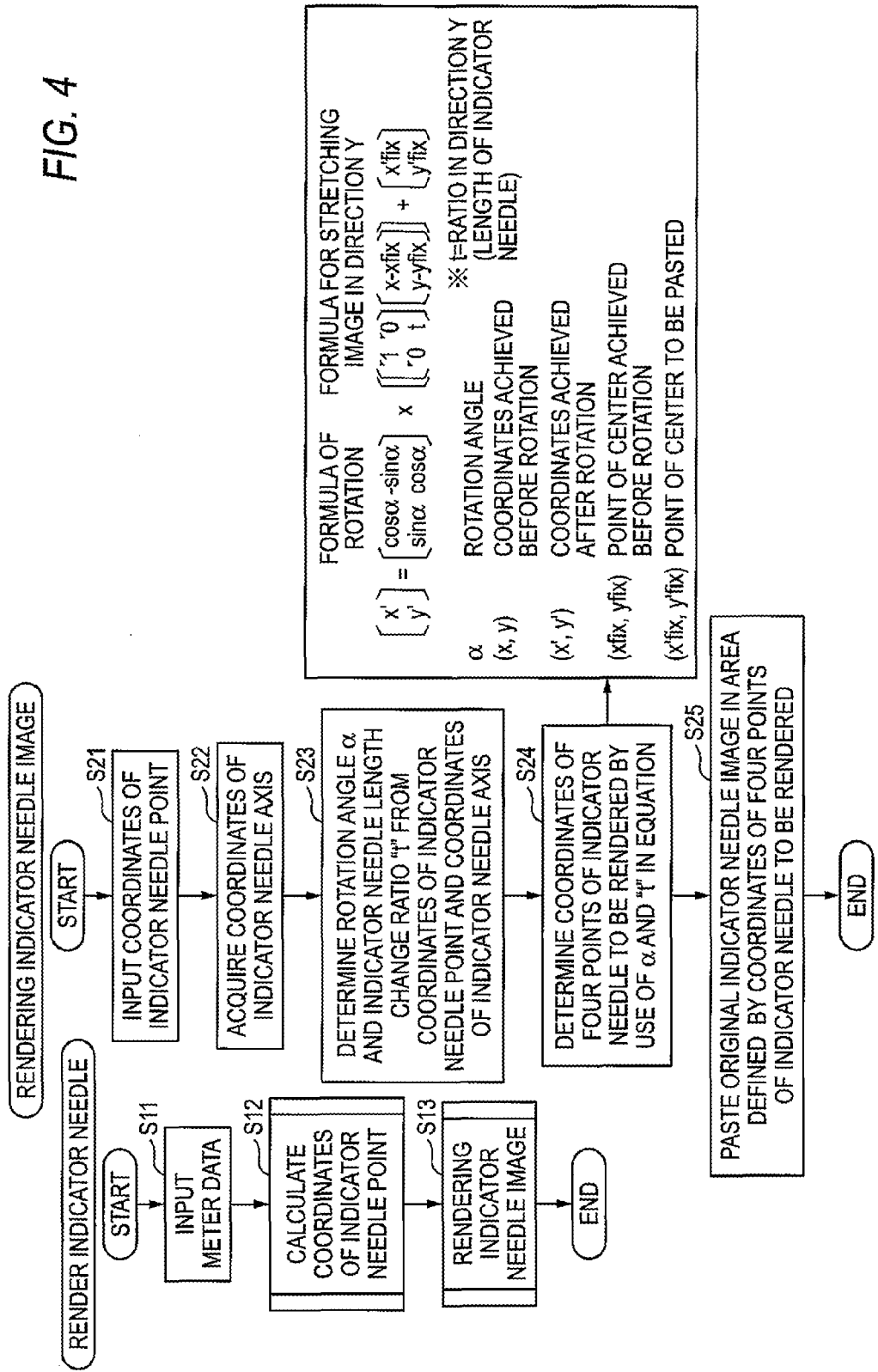
FIG. 4 is a flowchart showing principal operation of a meter display control section shown in FIG. 1.

Detailed operation of the graphic meter display device shown in FIG. 1 is hereunder described. FIG. 4 shows principal operation of the meter display control section 40 shown in FIG. 1. The tick marks 12 displayed on the number plate 11 at all times are previously rendered in the image memory and then displayed on the liquid crystal display panel 10 by means of the graphic display processing section 30 through use of the display data previously prepared in the number plate display element information table 44, before execution of processing shown in FIG. 4; namely, immediately after power of the display device has been turned on.

In step S11 shown in FIG. 4, the microcomputer 41 of the meter display control section 40 inputs data pertaining to the latest measured value by way of the measured value input section 42 and also lets the number plate display element information table 44 and the indicator needle display information table 45 input data required for a display.

Figure 8:
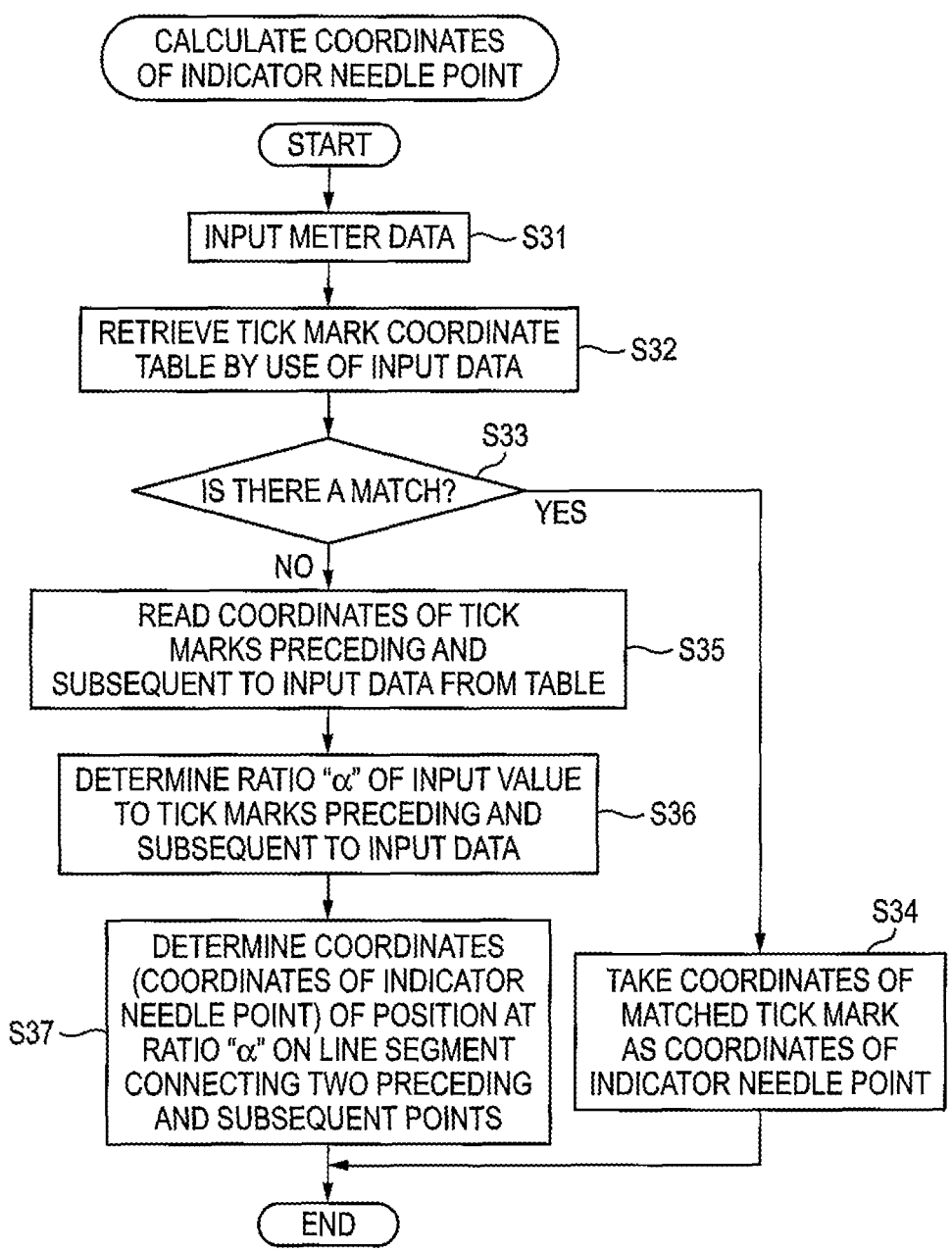
FIG. 8 is a flowchart showing processing for calculating coordinates pointed by the indicator needle.

In step S12, the microcomputer 41 calculates, through use of the foregoing method, the coordinates of the indicator needle point corresponding to the measured value input in step S11. FIG. 8 shows details on processing, which will be described later.

In step S13, the microcomputer 41 executes "indicator needle image rendering" in such a way that the indicator needle 13 is displayed in alignment with the position determined by the coordinates of the indicator needle point calculated in step S12. FIG. 4 shows details of "indicator needle image rendering" as steps S21 to S25.

Figure 5:
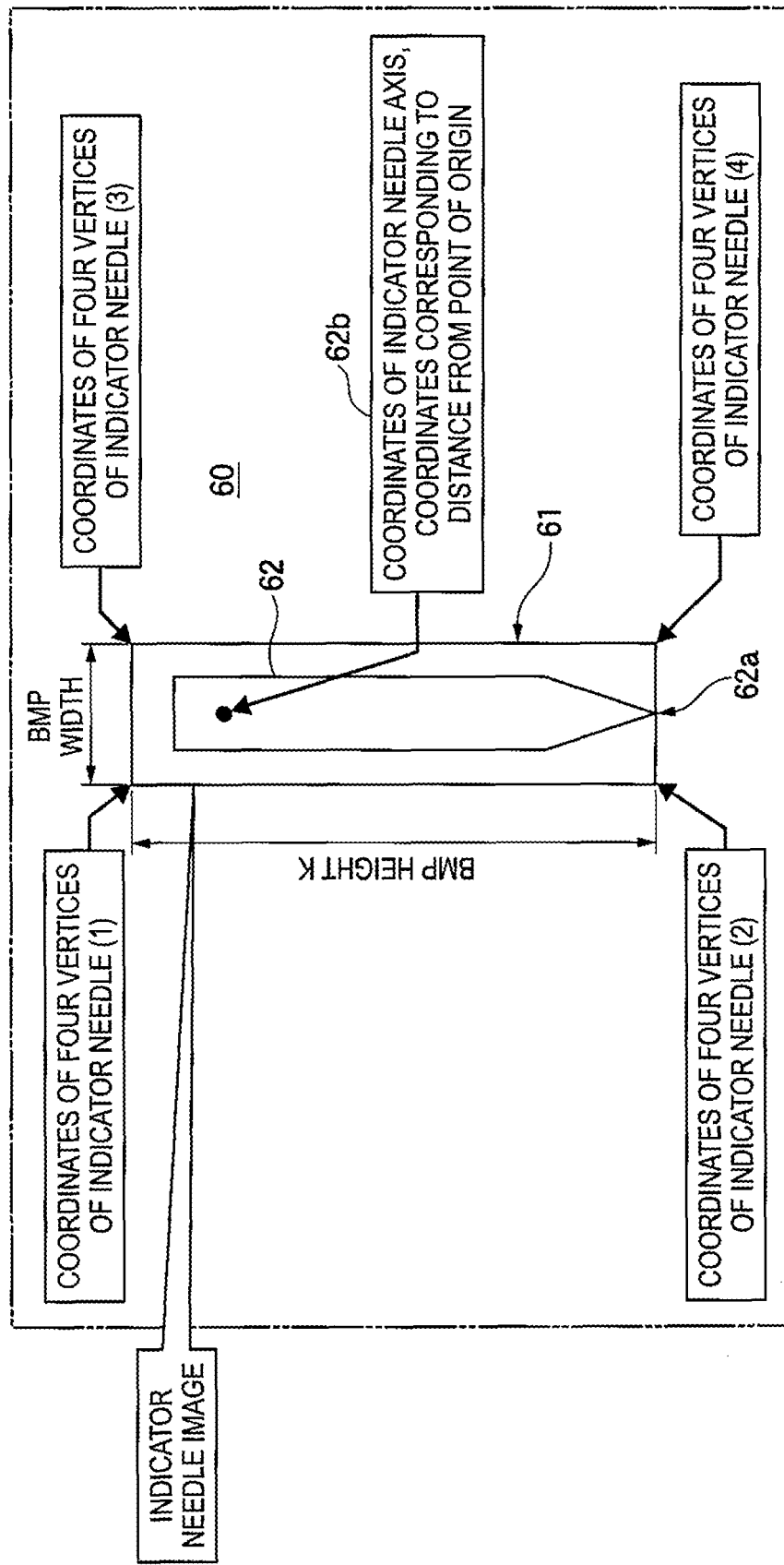
FIG. 5 is a diagrammatic illustration showing an example image of the indicator needle utilized during operation shown in FIG. 4.

For instance, an image of an indicator needle, such as that shown in FIG. 5, is used when processing shown in FIG. 4 is performed. Data pertaining to the indicator needle image are retained in the previously-determined indicator needle display information table 45. An indicator needle image 60 shown in FIG. 4 is made as two-dimensionally arrayed bitmap (BMP) data. An elongated indicator needle pattern 62 having a pointed extremity 62a is provided in a rectangular pattern 61 measuring a BMP width and a BMP length K. The rectangular pattern 61 has coordinate data pertaining to four vertices (1), (2), (3), and (4) of the rectangular pattern. Further, the indicator needle pattern 62 has coordinate data pertaining to an indicator needle axis 62b that serves as a turning center of the indicator needle pattern 62.

In step S21, the microcomputer 41 inputs the coordinates of the indicator needle point calculated in step S12 with respect to the latest measured value.

In step S22, the microcomputer 41 lets the number plate display element information table 44 input the coordinates of the indicator needle axis [the coordinates (XC, YC) shown in FIGS. 2 and 3] on the number plate 11 of the liquid crystal display panel 10.

Figure 6:
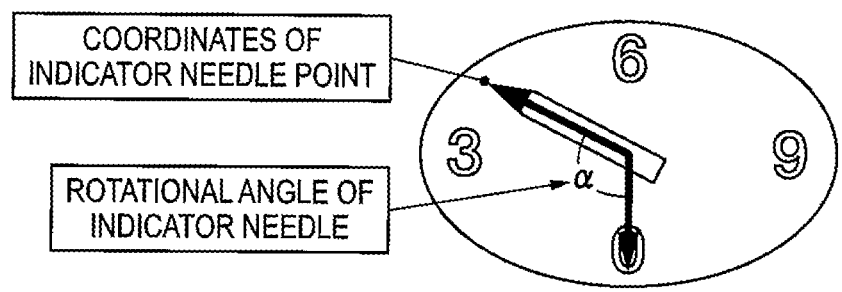
FIG. 6 is a front view showing a specific example positional relationship of the coordinates of the indicator needle on the number plate.
Figure 7:
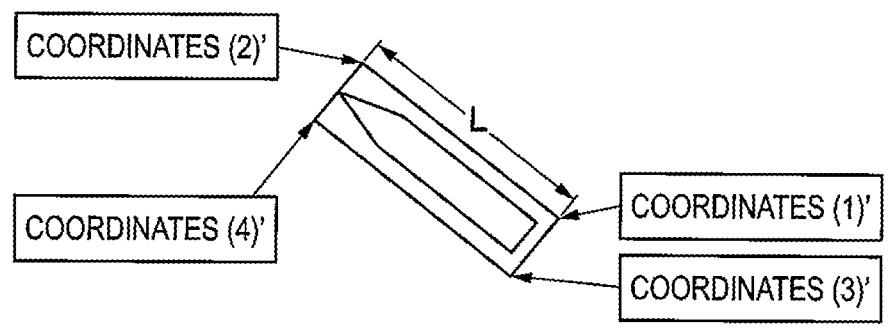
FIG. 7 is a front view showing a specific example image of the indicator needle displayed on the number plate of the meter.

In step S23, the microcomputer 41 determines a rotation angle α and an indicator needle length change ratio "t" required to change a direction of the indicator needle to the direction determined from the coordinates of the indicator needle point. Specifically, in order to orient the indicator needle image whose extremity 62a is downwardly directed in its initial state as shown in FIG. 5 toward the direction determined by the coordinates of the indicator needle point, such as that shown in FIG. 6, the indicator needle image must be turned through the rotation angle α, thereby processing the indicator needle image as shown in FIG. 7. The optimum length L of the indicator needle is not necessarily constant and varies according to the shape of the number plate 11, the shape of the tick marks 12, and a change in the coordinates of the indicator needle point. Accordingly, in order to make a correction to the BMP length K of the indicator needle image shown in FIG. 5 to the optimum indicator needle length L, an indicator needle length change ratio "t" (t=L/K) is determined.

In step S24, the microcomputer 41 calculates coordinates of the four vertices [(1)', (2)', (3)', and (4)' shown in FIG. 7] of the indicator needle pattern to be rendered after calculation processing, by use of the rotation angle α and the indicator needle length change ratio "t" determined in step S23, indicator needle image data, such as that shown in FIG. 5, and a calculation equation (a determinant) shown in FIG. 4.

In step S25, the microcomputer 41 commands a rendering processor in the graphic display processing section 30 to paste bitmap data pertaining to an indicator needle image, such as that shown in FIG. 5, to a display area represented by the coordinates of the four points [(1)', (2)', (3)', and (4)' shown in FIG. 7] determined in step S24. In response to the command, the rendering processor acquires bitmap data pertaining to the indicator needle image and performs rotation processing commensurate with the rotation angle α and scaling of the indicator needle length commensurate with the indicator needle length change ratio "t." Subsequently, the processor pastes the bitmap pattern (a pattern, such as that shown in FIG. 7) to a rectangular area, on the image memory, having four vertices determined by coordinates of the four points (1)', (2)', (3)', and (4)'.

Specifics of processing pertaining to "calculation of coordinates of an indicator needle point" shown in FIG. 8 are now described.

In step S31 shown in FIG. 8, the microcomputer 41 of the meter display control section 40 inputs data pertaining to the latest measured value by way of the measured value input section 42 and also lets the number plate display element information table 44 and the indicator needle display information table 45 input data required for processing.

In step S32, the microcomputer 41 retrieves details of a tick mark coordinate table (e.g., the group of sets of coordinate data 14 shown in FIG. 2) retained in the number plate display element information table 44 and also searches a typical numeric value matching the input measured value.

When the typical numeric value matching the measured value is found in step S32, processing proceeds from step S33 to S34. In contrast, when a coincident typical numeric value does not exist, processing proceeds from step S33 to S35.

In step S34, the microcomputer 41 outputs, as coordinates of the indicator needle point, a result of search performed in step S32; namely, coordinates assigned to one typical numeric value matching the measured value in the tick mark coordinate table. For instance, when the meter is a tachometer and when an input measured value is 3000 rpm, the typical numeric value 3000 in the group of sets of coordinate data 14 shown in FIG. 2 matches the measured value. Therefore, the coordinates (X3, Y3) assigned to the typical numeric value 3000 are output, without modification, as coordinates of an indicator needle point.

In step S35, the microcomputer 41 extracts, from the plurality of typical numeric values in the tick mark coordinate table, two typical numeric values whose magnitudes are adjacent, above and below (or front and back), to an input measured value as a first typical numeric value and a second typical numeric value.

For instance, when a value of 2400 rpm is input as a measured value, a typical numeric value of 3000 that is slightly larger than 2400 and a typical numeric value of 2000 that is slightly smaller than 2400 are read as a first typical numeric value and a second typical numeric value from the tick mark coordinate table.

In step S36, the microcomputer 41 determines a ratio "a" between the measured value, the first typical numeric value, and the second typical numeric value. For instance, when the measured value is 2400 rpm, when the first typical numeric value is 3000, and when the second typical numeric value is 2000, the ratio "a" is determined by; for instance, the following equation.

"$a$"=(2400−2000)/(3000−2000)=4/10

In step S37, the microcomputer 41 determines an intermediate position, which is determined by the ratio "a" calculated in step S36, on a line segment that connects the first display coordinates (X3, Y3) assigned to the first typical numeric value to the second display coordinates (X2, Y2) assigned to the second typical numeric value. Coordinates of the intermediate point are output as coordinates of the indicator needle point. For instance, when the length of the line segment is L0, the position of a point (L0×"a") on the line segment spaced apart from the second display coordinates (X2, Y2) corresponds to the coordinates of the indicator needle point.

Various example modifications of the graphic display device are now described.

Figure 9:
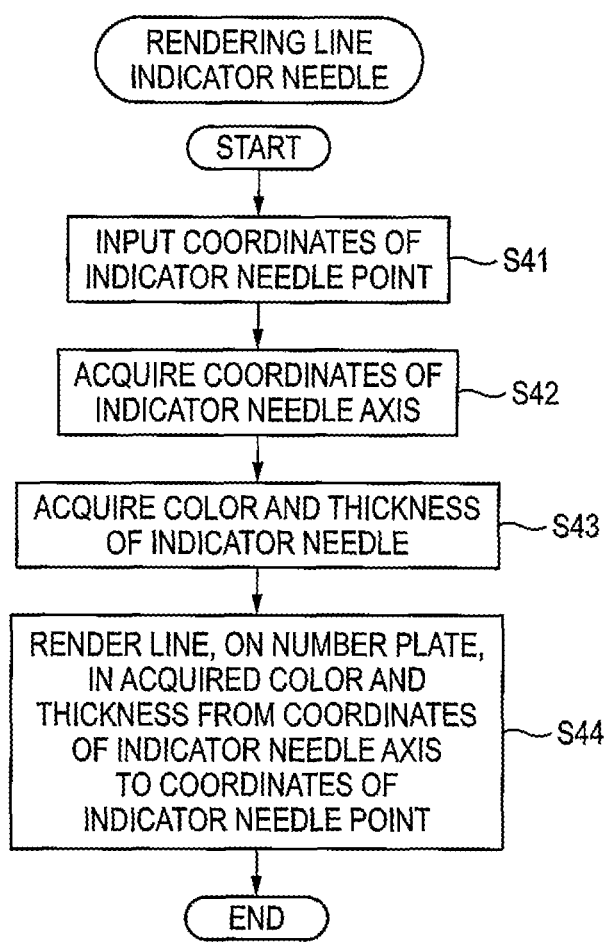
FIG. 9 is a flowchart showing an example modification of processing performed for displaying the indicator needle.

FIG. 9 shows example modifications of processing performed to display an indicator needle. "Rendering of line indicator needle" shown in FIG. 9 can be utilized in place of processing pertaining to step S13 shown in FIG. 4.

In step S41 shown in FIG. 9, the microcomputer 41 inputs the foregoing coordinates of the indicator needle point calculated in step S12 with respect to the latest measured value.

In step S42, the microcomputer 41 let the number plate display element information table 44 input coordinates (the coordinates (XC, YC) shown in FIGS. 2 and 3) of the indicator needle axis on the number plate 11 of the liquid crystal display panel 10.

In step S43, the microcomputer 41 acquires information representing the color of the indicator needle and information representing the thickness of the indicator needle from among pieces of information representing characteristics of the indicator needle to be displayed. The pieces of information are previously retained in the indicator needle display information table 45 as constant data. The microcomputer 41 acquires required information from the indicator needle display information table 45.

In step S44, the microcomputer 41 commands the graphic display processing section 30 to render a linear line pattern over a range of the line segment connecting the coordinates of the indicator needle axis acquired in step S42 to the coordinates of the indicator needle point acquired in step S41, through use of information about the color and thickness of the indicator needle acquired in step S43.

Processing may also be performed in lieu of processing pertaining to step S44.

1. Render as a "center line" a line segment that connects the coordinates of the indicator needle axis to the coordinates of the indicator needle point and that has a given thickness.

2. Render a plurality of line segments equivalent to the thickness of the indicator needle at positions that slightly deviate from the center line in the widthwise direction in such a way that the line segments deviate from one after another by a distance corresponding to the width of the line segment.

3. Uniformly render short line segments to respective single ends of the plurality of line segments from the coordinates of the indicator needle point. The short line segments make it possible to represent the shape of the indicator needle having a pointed extremity.

4. Further, slightly change colors of the line segments to be rendered one after another. It thereby becomes possible to represent a three-dimensional indicator needle pattern.

Figure 10:
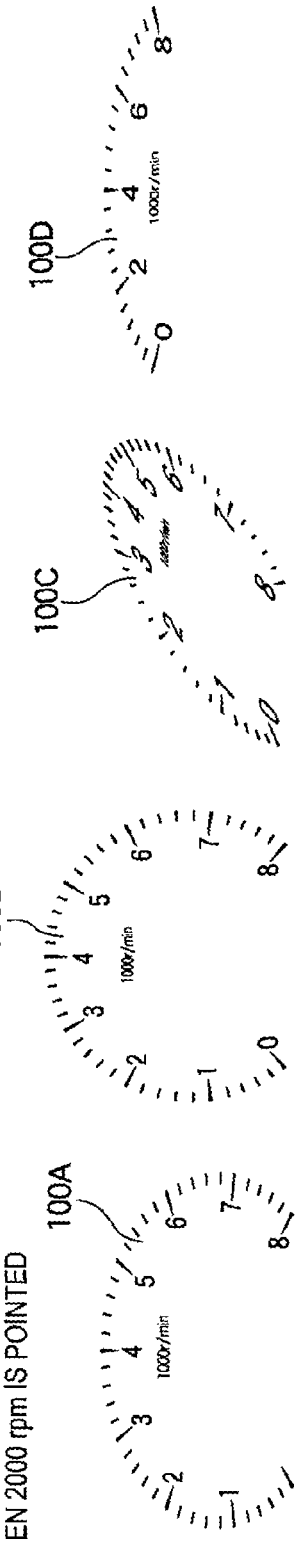
FIG. 10 is a front view showing various types of display forms applicable to the display device shown in FIG. 1.
Figure 10:
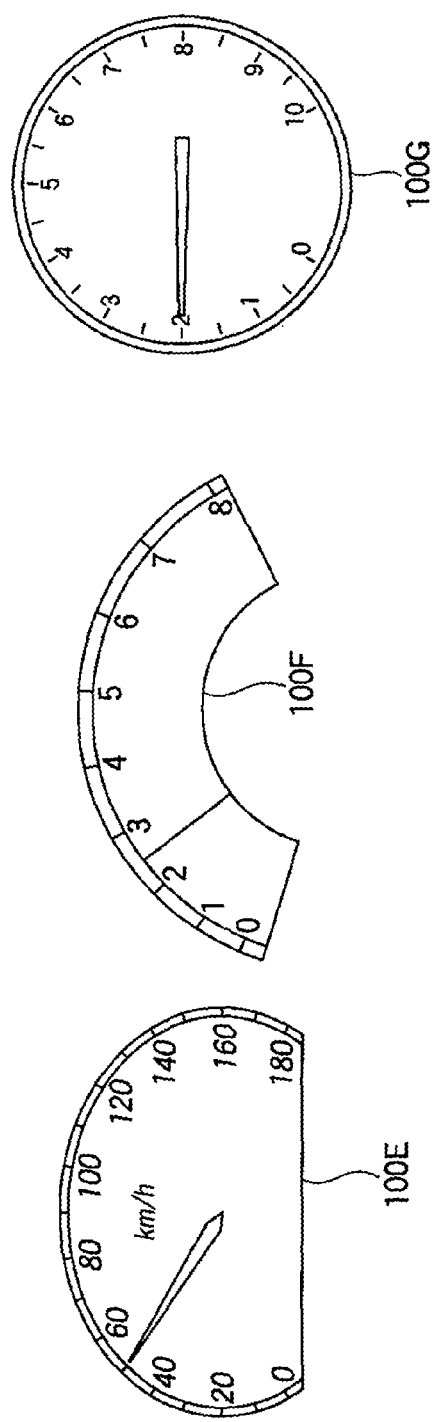

FIG. 10 shows various types of display forms applicable to the device shown in FIG. 1. In relation to the shape of the number plate, a design close to an oval shape is adopted for a display form 100A and a display form 100E shown in FIG. 10. In relation to a display form 100B and a display form 100G, a design close to a circular shape is adopted as the shape of the number plate. In relation to a display form 100C, a design having an oval shape stretched in an oblique direction is adopted as the number plate. In relation to a display form 100D and a display form 100F, a design close to a circular-arc shape or a fan shape is adopted as the number plate.

When number plates having these designs are adopted, the tick marks are not uniformly spaced. There are cases where spacing between tick marks on the number plate is adjusted regardless of the shape of the number plate, because of various restrictions or for the purpose of improving visibility. Even when spacing between tick marks is not uniform as mentioned above and when the indicator needle is displayed according to the foregoing method, a discrepancy between the tick mark and the position pointed by the indicator needle can be eliminated. Namely, the coordinates of the indicator needle point are determined with reference to the two typical numeric values adjacent, above and below, to the measured value to be displayed and coordinates thereof. Therefore, even when a change has occurred in spacing between the two typical numeric values on the tick marks, a relative positional relationship between the coordinates of the two typical numeric values and the coordinates of the indicator needle point remains unchanged.

Figure 11:
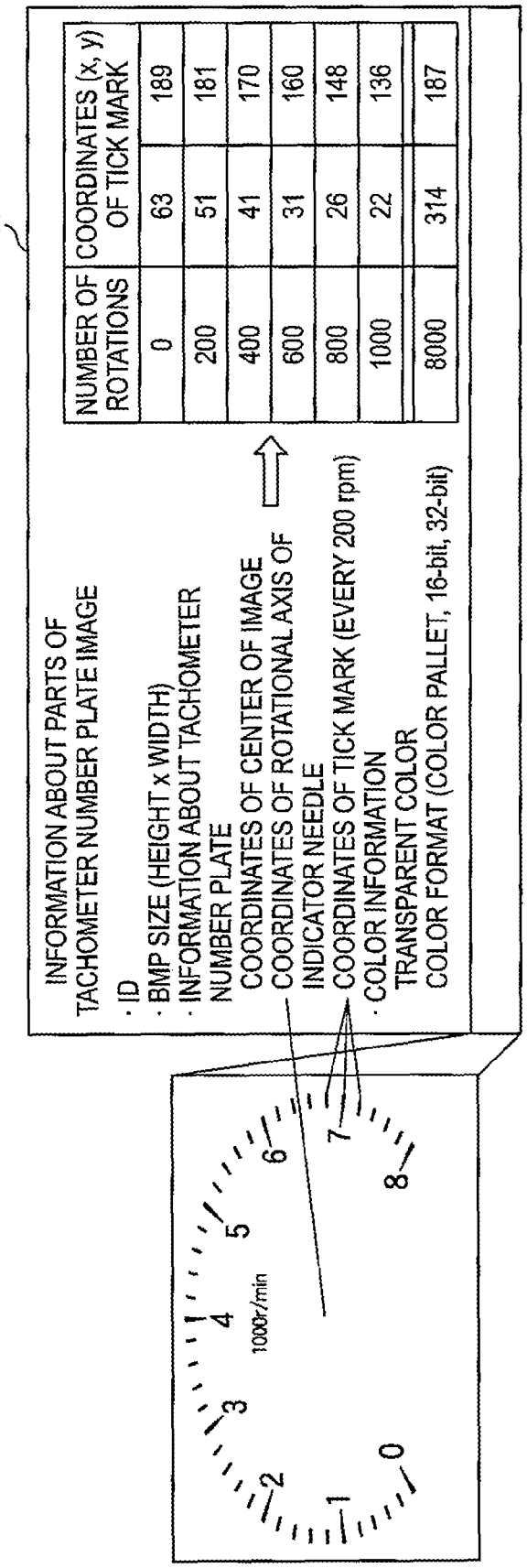
FIG. 11 is a diagrammatic illustration showing specific example details of data retained in a number plate display element information table.

FIG. 11 shows specific example details of the data retained in the number plate display element information table 44 shown in FIG. 1. The data shown in FIG. 11 are necessary to display a number plate of a tachometer.

Referring to FIG. 11, the data include identification information (ID) about a number plate, a size (a height×a width) of bitmap (BMP) image data used for displaying a number plate, coordinates of a center of an image on the number plate, rotational coordinates of the indicator needle axis on the number plate, information about tick marks on the number plate, color information, and bitmap image data used for displaying a number plate.

In relation to the information about tick marks, a corresponding number of rotations (a typical numeric value) and coordinates (x, y) of a position of a corresponding tick mark are retained for each of a plurality of typical numeric values assigned every 200 rpm (0, 200, 400, 600, . . . ).

Figure 12:
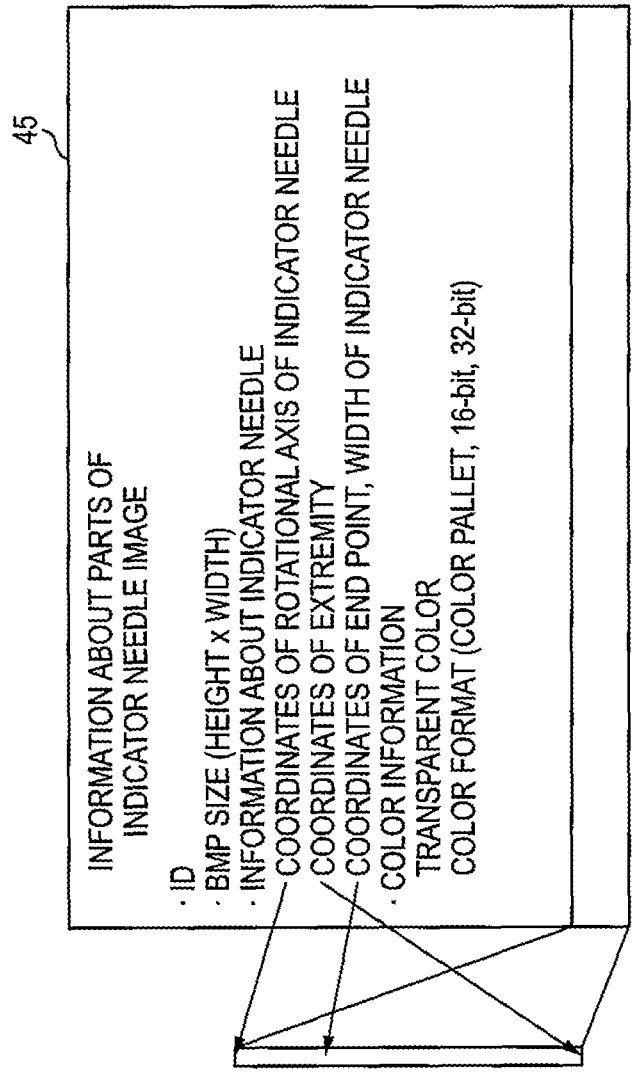
FIG. 12 is a diagrammatic illustration showing specific example details of data retained an indicator needle display information table.

FIG. 12 shows specific example details of data retained in the indicator needle display information table 45 shown in FIG. 1. The data shown in FIG. 12 are necessary to display an indicator needle on the number plate.

Referring to FIG. 12, the data include identification information (ID) about an indicator needle, a size (a height×a width) of bitmap (BMP) image data used for displaying an indicator needle, rotational coordinates of the indicator needle axis, coordinates of an extremity of the indicator needle, coordinates of an end point of the indicator needle, the width of the indicator needle, color information, and bitmap image data used for displaying an indicator needle.

The present embodiment is based on a premise that the number plate and tick marks on the plate as well as the indicator needle are implemented by means of a graphic display. However, only the indicator needle may be displayed by means of a graphic display, and the number plate and tick marks on the plate can also be implemented by use of a common print or a physical design element.

As mentioned above, the graphic meter display device and method of the present invention can be utilized; for instance, when meters of an automobile; namely, a tachometer, a speed meter, a fuel gauge, a water temperature gauge, a clock, and the like, are graphically displayed. Even when tick marks on a number plate are not equidistantly spaced, the indicator needle can be displayed in a correct direction by application of the present invention. Accordingly, the degree of freedom achieved when the number plate of the meter is designed is enhanced, and the present invention can also be utilized for enhancing visibility of display details. Further, burden of processing for displaying the indicator needle can also be lessened.

What is claimed is:

1. A graphic meter display device comprising an indicator needle pointing out an input measured value and tick marks enabling reading of a value pointed by the indicator needle, visibly displaying at least the indicator needle at a position corresponding to the measured value by a graphic display, the graphic meter display device comprising:
a tick mark information retaining section that, in relation to respective positions of three or more typical readable tick marks among tick marks, retains information representing display coordinates in correspondence with typical numeric values assigned to the typical tick mark positions;
an indicator needle point coordinate calculation section that extracts, as a first typical numeric value and a second typical numeric value, two typical numeric values adjacent, above and below, to a magnitude of the input measured value from positions of the three or more typical tick marks according to the input measured value and that calculates an intermediate position which lies on a line segment connecting first display coordinates corresponding to the first typical numeric value with second display coordinates corresponding to the second typical numeric value and which is determined by the first typical numeric value, the second typical numeric value, and the measured value as coordinates of an indicator needle point; and
a graphic display section that renders a display pattern of the indicator needle in such a way that an extremity of the indicator needle or a portion thereof is situated in a vicinity of coordinates of the indicator needle point and with reference to the coordinates of the indicator needle point.

2. The graphic meter display device according to claim 1, wherein the indicator needle point coordinate calculation section calculates an intermediate position, where the line segment is to be split, as coordinates of an indicator needle point according to a ratio of a spacing value that is a difference between the first typical numeric value and the second typical numeric value to a fractional value that is a difference between the measured value and the first typical numeric value or the second typical numeric value.

3. The graphic meter display device according to claim 2, wherein the graphic display section calculates a pointing direction of the indicator needle from coordinates of a predetermined indicator needle axis and the coordinates of the indicator needle point, rotates a previously prepared indicator needle image pattern according to the pointing direction through calculation processing, and pastes the rotated indicator needle image pattern to a display position determined from the coordinates of the indicator needle axis and the coordinates of the indicator needle point, thereby displaying the indicator needle.

4. The graphic meter display device according to claim 2, wherein the graphic display section renders, on the basis of coordinates of previously determined indicator needle axis and the coordinates of the indicator needle point, a linear pattern connecting the coordinates of the indicator needle point to the coordinates of the indicator needle axis in previously designated color and thickness and displays the thus-rendered indicator needle.

5. The graphic meter display device according to claim 2, wherein, the graphic display section renders, on the basis of coordinates of previously determined indicator needle axis and the coordinates of the indicator needle point, line segments in number equal to a previously designated thickness, around a line connecting the coordinates of the indicator needle point to the coordinates of the indicator needle axis and displays the indicator needle.

6. The graphic meter display device according to claim 1, wherein the indicator needle point coordinate calculation section determines whether or not a numeric value matching the input measured value is included in the typical numeric values assigned respectively to the three or more typical tick mark positions and outputs a corresponding typical numeric value as coordinates of the indicator needle point when a match exists.

7. The graphic meter display device according to claim 1, wherein the tick mark information retaining section retains information for rendering the tick marks in correspondence with image data for rendering a number plate.

8. A graphic meter display method for visibly displaying at least an indicator needle of a meter which has an indicator needle for pointing out an input measured value and tick marks for enabling reading of a value pointed by the indicator needle, at a position corresponding to the measured value by means of a graphic display, the method comprising:
retaining, in relation to positions of three or more typical readable tick marks among tick marks, information representing display coordinates in correspondence with typical numeric values assigned to the typical tick mark positions;
extracting, as a first typical numeric value and a second typical numeric value, two typical numeric values adjacent, above and below, to a magnitude of the input measured value from positions of the three or more typical tick values according to the input measured value;
calculating an intermediate position which lies on a line segment connecting first display coordinates corresponding to the first typical numeric value with second display coordinates corresponding to the second typical numeric value and which is determined by the first typical numeric value, the second typical numeric value, and the measured value as coordinates of an indicator needle point; and
rendering a display pattern of the indicator needle in such a way that an extremity of the indicator needle or a portion thereof is situated in a vicinity of coordinates of the indicator needle point and with reference to the coordinates of the indicator needle point.

* * * * *